No. 624,423. Patented May 2, 1899.
J. P. BAIRD.
OVERHEAD VEHICLE WASHER.
(Application filed Apr. 20, 1898.)
(No Model.)

WITNESSES
E. F. Barritt.
J. J. Gammon

INVENTOR
John P. Baird

UNITED STATES PATENT OFFICE.

JOHN P. BAIRD, OF NEW YORK, N. Y.

OVERHEAD VEHICLE-WASHER.

SPECIFICATION forming part of Letters Patent No. 624,423, dated May 2, 1899.

Application filed April 20, 1898. Serial No. 678,315. (No model.)

*To all whom it may concern:*

Be it known that I, JOHN P. BAIRD, a citizen of the United States, and a resident of New York, in the county of New York and State of New York, have invented a certain new and useful Overhead Vehicle-Washer, of which the following is a specification.

This invention relates to an overhead vehicle-washing device; and the object is to supply devices of this class with an illuminating attachment, whereby gas, oil, or electricity can be used.

Figure 1:
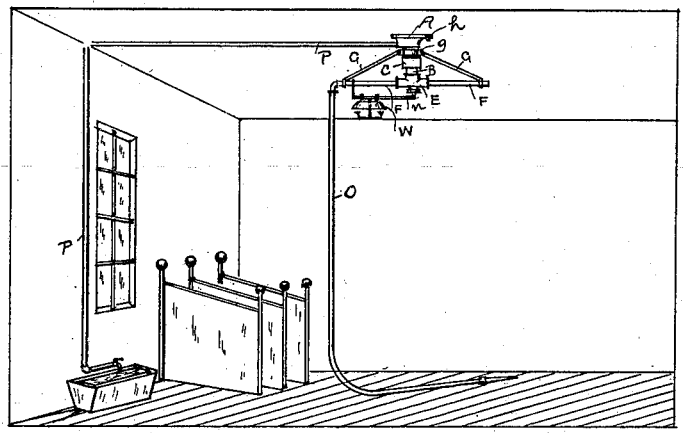
Figure 2:
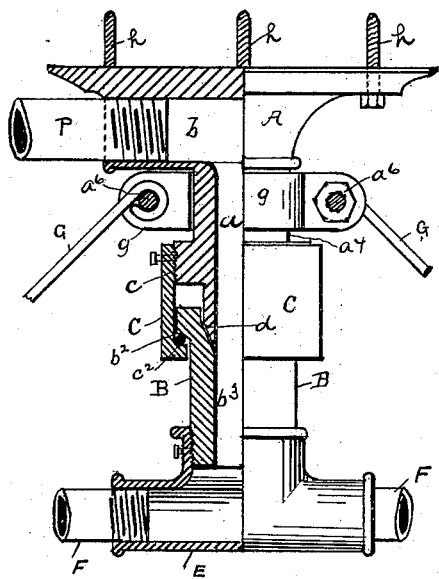
Figure 3:
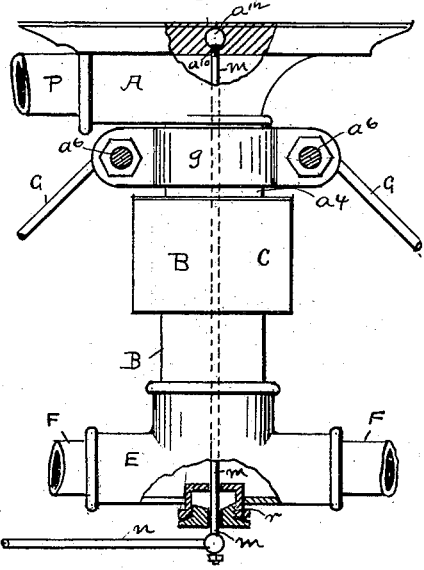
Figure 4:
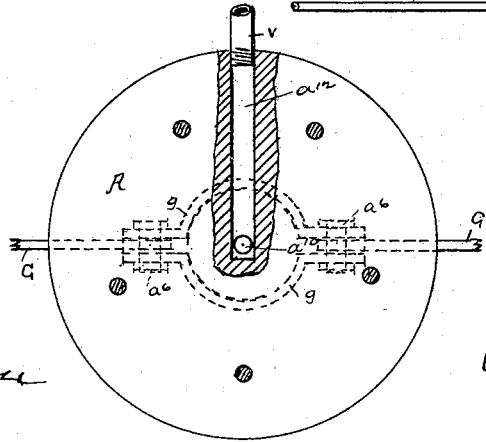

Referring to the drawings, Figure 1 is a perspective view showing my device in position and ready for use. Fig. 2 is a detached half-sectional view of the device. Fig. 3 is an elevation of the device, showing the pipe attached for conveying gas, oil, or electricity. Fig. 4 is a top view, partly in section.

A is the upper or bracket section, having central hole $a$, with branch opening $b$, connected as shown in Fig. 1.

B is the revolving section, with central hole $b^3$, and is held to the upper section by the collar C, threaded at $c$ to the section A. A shoulder $b^2$ is formed as the revolving section against which rests the shoulder $c^2$ of the collar. Suitable packing or a spring, or both, can be placed between these shoulders. Where the two sections come together, $d$, the ends thereof are beveled off (see Fig. 2) for the purpose of insuring a tight joint; but the angles of these surfaces should not be wedging, but rather supporting, so that when the lower section revolves it will not bind, but lightly form a tight joint.

The end of the lower section supports the T-joint E by threading and set-screw, and this T-joint has threaded and set-screwed into it the pipes F. To support the ends of these pipes, I use the brace-rods G, which are fastened at the upper end to the clip $g$, encircling the portion $a^4$ of the upper section and secured in place by bolts $a^6$. The lower ends of these brace-rods are secured by a clip to the pipes F. To the pipe F is connected the hose O. One or both pipes F can be used, as circumstances require. The above parts, excepting the hose, are made of any suitable material and fastened to the ceiling by bolts $h$. (See Figs. 1 and 2.) The water-pipe P is connected to the horizontal opening $b$ by threads, and water admitted into the central opening of the sections through T-joint into whichever pipe F is used and from thence into the hose for the use required. To reach all sides of a vehicle being washed only requires to revolve the lower section, which will freely turn in whatever direction required.

Having described the washer, I will proceed to describe the illuminating attachment to same, which consists in passing through the sections the pipe $m$, which is screwed into a hole $a^{10}$ in the upper section, connecting with a horizontal opening $a^{12}$. This pipe $m$ extends down through the T-joint and through a stuffing-box $r$ to the outside of said T-joint, where it is connected by globe-valve to branch $n$, extending under the pipes F. (See Fig. 1.) The extreme outer end of pipe $n$ has burners if gas is used, or incandescent lamps if electricity is used, or a lamp if oil is used. The pipes $n$ are supported to the pipes F in any suitable manner. Over the burners is placed the reflector W, which throws the light down upon the object washed. If gas is used, the horizontal opening is attached to the gas-pipe $v$; if electricity, a wire is passed down said pipe $m$; if oil, a lamp can be placed on the burners. Now it is obvious as the lower section revolves the illuminating device or attachment will revolve with it, thus giving light without the use of a lantern or giving trouble to the person washing the vehicle.

The angle given to the brace-rod supports the pipes F to a better advantage than could otherwise be effected.

There can be two reflectors and burners, if necessary.

What I claim is—

In an overhead vehicle-washer, the combination with the supply-pipe of a conduit for illuminating purposes, said conduit passing through the water-pipes and through a stuffing-box on the under side of the pipe-section, substantially as and for purpose described.

Signed at New York, in the county of New York and State of New York, this 8th day of April, A. D. 1898.

JOHN P. BAIRD.

Witnesses:
E. F. BARRITT,
J. J. GANNON.